US 9,950,573 B2

(12) United States Patent
Fujioka

(10) Patent No.: US 9,950,573 B2
(45) Date of Patent: Apr. 24, 2018

(54) PNEUMATIC TIRE

(71) Applicant: TOYO TIRE & RUBBER CO., LTD., Osaka-shi, Osaka (JP)

(72) Inventor: Tsuyoshi Fujioka, Osaka (JP)

(73) Assignee: TOYO TIRE & RUBBER CO., LTD., Osaka (JP)

(*) Notice: Subject to any disclaimer, the term of this patent is extended or adjusted under 35 U.S.C. 154(b) by 945 days.

(21) Appl. No.: 14/297,808

(22) Filed: Jun. 6, 2014

(65) Prior Publication Data

US 2014/0360639 A1 Dec. 11, 2014

(30) Foreign Application Priority Data

Jun. 10, 2013 (JP) ................. 2013-122126
May 27, 2014 (JP) ................. 2014-109317

(51) Int. Cl.
| B60C 11/117 | (2006.01) |
| B60C 11/12 | (2006.01) |
| B60C 11/13 | (2006.01) |
| B60C 11/11 | (2006.01) |
| B60C 11/03 | (2006.01) |

(52) U.S. Cl.
CPC ........ B60C 11/0306 (2013.01); B60C 11/032 (2013.01); B60C 11/1236 (2013.01); *B60C 11/0309* (2013.01); *B60C 11/12* (2013.01); *B60C 11/1353* (2013.01); *B60C 2011/0355* (2013.01); *B60C 2011/1254* (2013.01); *B60C 2011/1361* (2013.01)

(58) Field of Classification Search
CPC ............. B60C 11/032; B60C 2011/1254
USPC .................................. 152/209.17
See application file for complete search history.

(56) References Cited

U.S. PATENT DOCUMENTS

2008/0149242 A1* 6/2008 Oyama ............... B60C 11/0309
152/209.19

FOREIGN PATENT DOCUMENTS

| JP | 03086606 A | * | 4/1991 | ........... B60C 11/032 |
| JP | 5-96913 A |  | 4/1993 | |
| JP | 07329510 A | * | 12/1995 | |
| JP | H07-329510 A |  | 12/1995 | |

(Continued)

OTHER PUBLICATIONS

Machine Translation: JP 03086606 A; Yamaguchi, Yutaka; no date.*

(Continued)

Primary Examiner — Steven D Maki
Assistant Examiner — Kendra Ly
(74) Attorney, Agent, or Firm — Westerman, Hattori, Daniels & Adrian

(57) ABSTRACT

Blocks are formed on a tread surface of a pneumatic tire by main grooves extending in the tire circumferential direction and lateral grooves which intersect with the main grooves. A size of the block in the tire width direction of the tread surface is set larger than a size of the block in the tire circumferential direction of the tread surface. The blocks include: center blocks which are positioned in a center region in the tire width direction; shoulder blocks which are positioned on both side regions in the tire width direction; and mediate blocks which are positioned in an intermediate region between the center blocks and the shoulder blocks. A recessed portion is formed on an approximately center portions of the shoulder blocks and the mediate blocks excluding the center blocks.

10 Claims, 9 Drawing Sheets

(56) References Cited

FOREIGN PATENT DOCUMENTS

| JP | 11-129709 A |   | 5/1999 |
|----|-------------|---|--------|
| JP | 2007099110 A | * | 4/2007 |
| JP | 2007-168644 A |   | 7/2007 |
| JP | 2007168644 A | * | 7/2007 |

OTHER PUBLICATIONS

Machine Translation: JP 07329510 A; Shimamoto, Yuji; no date.*
Machine Translation: JP-2007168644-A; Kaji, Shinichi; (Year: 2017).*
Machine Translation: JP-2007099110-A; Obara, Masaaki (Year: 2017).*
Office Action dated Sep. 18, 2016, issued in counterpart Chinese Application No. 201410250464.8, with English translation (13 pages).
Office Action dated Jan. 6, 2016, issued in counterpart Chinese Patent Application No. 201410250464.8, with English translation. (15 pages).
Office Action dated Aug. 29, 2017, issued in counterpart Japanese Patent Application No. 2014-109317 with machine translation.(5 pages).

* cited by examiner

Fig. 5

| | | | comparative example 1 | comparative example 2 | comparative example 3 | comparative example 4 | comparative example 5 | comparative example 6 |
|---|---|---|---|---|---|---|---|---|
| recessed portion 12 (snow hole) absence or presence | Ce | | absence | presence | presence | presence | presence | absence |
| | Me | | absence | presence | absence | presence | absence | absence |
| | Sh | | absence | presence | absence | absence | presence | absence |
| depth of recessed portion 12 | A/B*100 | | — | 60 | 60 | 60 | 60 | — |
| auxiliary block | main groove – lateral groove | | ○ | ○ | ○ | ○ | ○ | — |
| | lateral groove only | | — | — | — | — | — | — |
| absence or presence | no settings | | — | — | — | — | — | ○ |
| width of auxiliary block | C/D*100 | | 35 | 35 | 35 | 35 | 35 | — |
| traveling performance on ice | | | 100 | 98 | 98 | 99 | 97 | 95 |
| traveling performance on snow | | | 100 | 109 | 103 | 105 | 106 | 90 |
| biased abrasion resistance | | | 100 | 97 | 96 | 98 | 96 | 91 |

| | working example 1 | working example 2 | working example 3 | working example 4 | working example 5 | working example 6 | working example 7 | working example 8 | working example 9 | working example 10 |
|---|---|---|---|---|---|---|---|---|---|---|
| recessed portion 12 Ce | absence | absence | absence | absence | absence | absence | absence | absence | absence | absence |
| Me | presence | presence | presence | presence | presence | presence | presence | presence | presence | presence |
| Sh | presence | presence | presence | presence | presence | presence | presence | presence | presence | presence |
| A/B*100 | 20 | 40 | 60 | 60 | 15 | 55 | 60 | 80 | 60 | 60 |
| main groove – lateral groove | ○ | ○ | — | — | ○ | ○ | ○ | ○ | ○ | ○ |
| lateral groove only | — | — | ○ | — | — | — | — | — | — | — |
| no settings | — | — | — | ○ | — | — | — | — | — | — |
| C/D*100 | 35 | 35 | 35 | 35 | 15 | 55 | 35 | 35 | 25 | 45 |
| traveling performance on ice | 105 | 104 | 101 | 97 | 97 | 107 | 103 | 101 | 101 | 106 |
| traveling performance on snow | 91 | 98 | 106 | 103 | 112 | 98 | 107 | 112 | 109 | 103 |
| biased abrasion resistance | 106 | 103 | 98 | 92 | 98 | 110 | 102 | 100 | 101 | 105 |

Ce : center block 5  
Me : mediate block 6  
Sh : shoulder block 7

A : depth of recessed portion 12  
B : depth of main groove 2  
C : length of auxiliary block 22 in the tire width direction  
D : length of block 4 in the tire width direction

Fig. 6A

| | | comparative example 1 | comparative example 2 | comparative example 3 | comparative example 4 | comparative example 5 | working example 7 |
|---|---|---|---|---|---|---|---|
| recessed portion 12 absence or presence | Ce | absence | presence | presence | presence | presence | absence |
| | Me | absence | presence | absence | presence | absence | presence |
| | Sh | absence | presence | absence | absence | presence | presence |
| traveling performance on ice | | 100 | 98 | 98 | 99 | 97 | 103 |
| traveling performance on snow | | 100 | 109 | 103 | 105 | 106 | 107 |
| biased abrasion resistance | | 100 | 97 | 96 | 98 | 96 | 102 |

Fig. 6B

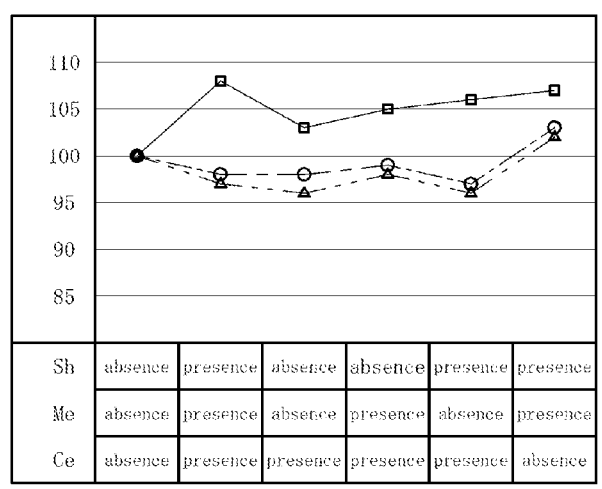

--◯--- traveling performance on ice
—□— traveling performance on snow
—△— biased abrasion resistance

| | | working example 1 | working example 2 | working example 7 | working example 8 |
|---|---|---|---|---|---|
| depth of recessed portion 12 | A/B*100 | 20 | 40 | 60 | 80 |
| traveling performance on ice | | 105 | 104 | 103 | 101 |
| traveling performance on snow | | 91 | 98 | 107 | 112 |
| biased abrasion resistance | | 106 | 103 | 102 | 100 |

--○-- traveling performance on ice
—□— traveling performance on snow
— △ — biased abrasion resistance

| | | working example 3 | working example 4 | working example 7 |
|---|---|---|---|---|
| recessed portion 12 absence or presence | no settings | — | — | ○ |
| | lateral groove only | ○ | — | — |
| | main groove and lateral groove | — | ○ | — |
| traveling performance on ice | | 101 | 97 | 103 |
| traveling performance on snow | | 106 | 103 | 107 |
| biased abrasion resistance | | 98 | 92 | 102 |

---○--- traveling performance on ice
———■——— traveling performance on snow
— ▲ — biased abrasion resistance

| | | working example 5 | working example 10 | working example 7 | working example 4 | working example 6 |
|---|---|---|---|---|---|---|
| width of auxiliray block | C/D*100 | 15 | 25 | 35 | 45 | 55 |
| traveling performance on ice | | 97 | 101 | 103 | 106 | 107 |
| traveling performance on snow | | 112 | 109 | 107 | 103 | 98 |
| biased abrasion resistance | | 98 | 101 | 102 | 105 | 110 | rate of the auxiliary block (C/D) (%)

- --○-- traveling performance on ice
- ──□── traveling performance on snow
- ──△── biased abrasion resistance

PNEUMATIC TIRE

CROSS-REFERENCE TO RELATED APPLICATIONS

This application claims priority from Japanese Patent Application No. 2013-122126 filed on Jun. 10, 2013, and Japanese Patent Application No. 2014-109317 filed on May 27, 2014, the disclosures of which are incorporated herein by reference in their entireties.

BACKGROUND OF THE INVENTION

Field of the Invention

The present invention relates to a pneumatic tire.

Description of the Related Art

Conventionally, there has been known a pneumatic tire where a plurality of blocks are formed on a tread surface of the pneumatic tire by main grooves extending in the circumferential direction and lateral grooves which intersect with the main grooves, and a recessed portion is formed on an approximately center portion of each block (see JP 05-96913 A, for example).

However, in the pneumatic tire described in JP 05-96913 A, the recessed portions formed in all blocks function as heat radiating holes. That is, compared to an amount of increase of a volume of the tire by making the block large-sized, the increase of an amount of a surface area of the tire is small and hence, there is a possibility that heat generated inside the tire is not properly radiated. The recessed portions are formed only for enlarging such a surface area in view of the above-mentioned possibility.

Although it is expected that the recessed portions exhibit a snow biting effect at the time of traveling on a snow surface, JP 05-96913 A neither discloses nor suggests such a point.

SUMMARY OF THE INVENTION

Inventors of the present invention have focused on a point that when a recessed portion is formed on the block, at the time of the block being brought into contact with a road surface, the block is liable to be deformed so that the block is liable to be worn. The inventors also have found out a point that when the block at the center position in the tire width direction of a tread surface (center block) is brought into contact with a road surface, even when the recessed portion is formed on the block, the recessed portion collapses and hence, the recessed portion cannot exhibit a snow biting effect.

Accordingly, it is an object of the present invention to enhance a traveling performance on snow and a traveling performance on ice while ensuring abrasion resistance by maintaining rigidity of blocks.

As a means for overcoming the above-mentioned drawbacks, according to one aspect of the present invention, there is provided a pneumatic tire where blocks are formed on a tread surface by main grooves extending in the tire circumferential direction and lateral grooves which intersect with the main grooves, wherein a size of the block in the tire width direction is set larger than a size of the block in the tire circumferential direction, the blocks include: center blocks which are positioned in a center region in the tire width direction; shoulder blocks which are positioned on both side regions in the tire width direction; and mediate blocks which are positioned in an intermediate region between the center blocks and the shoulder blocks, and a recessed portion which is formed on an approximately center portions of the shoulder blocks and the mediate blocks excluding the center blocks.

Due to such a constitution, the recessed portion is not formed on the center blocks on which the largest ground contact pressure is easy to act when the center blocks are brought into contact with a road surface during traveling, and hence, the deformation of the center blocks is suppressed so that damage caused by biased abrasion is suppressed whereby the pneumatic tire achieves a long life. Further, by forming the recessed portion on the shoulder blocks and the mediate blocks, a traveling performance on snow and a traveling performance on ice can be enhanced.

It is desirable that the shoulder block and the mediate block extend in the tire circumferential direction, and include a groove portion which separates the shoulder block and the mediate block in the tire width direction.

Due to such a constitution, a skid which may occur during turn traveling on a slippery road surface such as a surface of ice can be effectively prevented. That is, even during turn traveling, due to the groove portions which divide the block in the tire width direction, the block can exhibit a snow biting effect.

It is preferable that four or more sipes which extend in the tire width direction are formed in each block, the sipe formed at a center portion in the tire circumferential direction has one end thereof opened in the main groove and the other end thereof terminated in the inside of the block, and the sipes which are formed on both sides in the tire circumferential direction have both ends thereof terminated in the inside of the block.

Due to such a constitution, the distribution of ground contact pressure when each block is brought into contact with a road surface can be made uniform. Accordingly, biased abrasion is hardly generated in the block thus enabling the pneumatic tire to achieve a long life.

It is desirable that the sipes formed in the shoulder block and the mediate block are arranged so as to surround a center position of each block.

Due to such a constitution, in either one of the shoulder block and the mediate block which is liable to be deformed due to the formation of the recessed portion, the distribution of a ground contact pressure when the block is brought into contact with a road surface at the time of traveling can be made uniform.

It is desirable that positions of the lateral grooves which separate the center blocks in the tire circumferential direction and positions of the lateral grooves which separate the mediate blocks in the tire circumferential direction agree with each other.

Due to such a constitution, a snow column shearing force can be acquired due to a plurality of lateral grooves simultaneously at the time of starting a vehicle thus enhancing a traction property.

It is desirable that the pneumatic tire includes an auxiliary block which connects, via the main groove, the lateral groove formed between the shoulder blocks and the lateral groove formed between the mediate blocks which are positionally displaced from each other in the tire circumferential direction.

Due to such a constitution, the blocks which are positionally displaced from each other in the tire circumferential direction can be connected to each other by the auxiliary block. Accordingly, it is possible to prevent the occurrence of a state where the shoulder block and the mediate block are excessively deformed and are positionally displaced from each other by being influenced by a ground contact pressure generated when the blocks are brought into contact with a road surface during traveling and hence, it is possible to effectively prevent the occurrence of abrasion, particularly biased abrasion.

It is desirable that a size in the tire width direction of a first projection positioned in the inside of the lateral groove formed in the auxiliary block is 20% or more and 50% or less of the size in the tire width direction of the block.

Due to such a constitution, it is possible to make the block properly exhibit a snow biting effect due to the lateral grooves while effectively suppressing the deformation of the block. The deformation of the block cannot be effectively suppressed when the size of the first projection is less than 20%, and the block cannot exhibit a snow biting effect which the lateral groove originally possesses when the size of the block in the tire width direction exceeds 50%.

It is desirable that an end portion of the auxiliary block is terminated in the inside of the lateral groove inside the end portion of the block.

Due to such a constitution, a state is brought about where the end portion of the auxiliary block, particularly a corner portion of the auxiliary block is substantially guided between the blocks and hence, there is no possibility that a drawback arises where the block is partially broken due to a foreign material which invades into the block as in the case where the end portion of the auxiliary block is terminated in the main groove. Further, an edge portion of the block formed by the lateral groove is not influenced by the auxiliary block and hence, an edge effect is not impaired.

It is desirable that a portion of the auxiliary block formed in the main groove is formed with a groove depth smaller than a groove depth of portions formed in the lateral groove.

Due to such a constitution, it is possible to make it difficult for a foreign material such as a pebble to get stuck in the main groove during traveling.

It is desirable that a second projection positioned in the inside of the main groove formed on the auxiliary block includes a concave portion where a depth of the concave portion is partially increased.

Due to such a constitution, the depth of the main groove can be changed even in a middle portion of the second projection. Accordingly, it is possible to remove pebbles got stuck in the main groove more effectively.

According to the present invention, the recessed portion is formed in the shoulder blocks and the mediate blocks excluding the center blocks and hence, it is possible to prevent the deformation of the block at the portion on which the largest ground contact pressure acts and hence, it is possible to make the blocks exhibit a snow biting effect during traveling on ice or snow while suppressing damage caused by biased abrasion.

BRIEF DESCRIPTION OF THE DRAWINGS

FIG. 5 is a table showing a result of evaluations on a traveling performance on ice, a traveling performance on snow and a biased abrasion resistance with respect to the combinations in the case where a recessed portion is formed in respective blocks and in the case where the recessed portion is not formed in the respective blocks;

FIG. 6A is a table prepared by extracting the result of the evaluation from FIG. 5 on the tire performance between the case where the recessed portion is formed in each block and the case where the recessed portion is not formed in the respective blocks;

FIG. 6B is a view in the form of a graph prepared in accordance with table shown in FIG. 6A;

DETAILED DESCRIPTION OF THE INVENTION

Preferred embodiments of the present invention will be explained hereinafter by reference to attached drawings.

Figure 1:
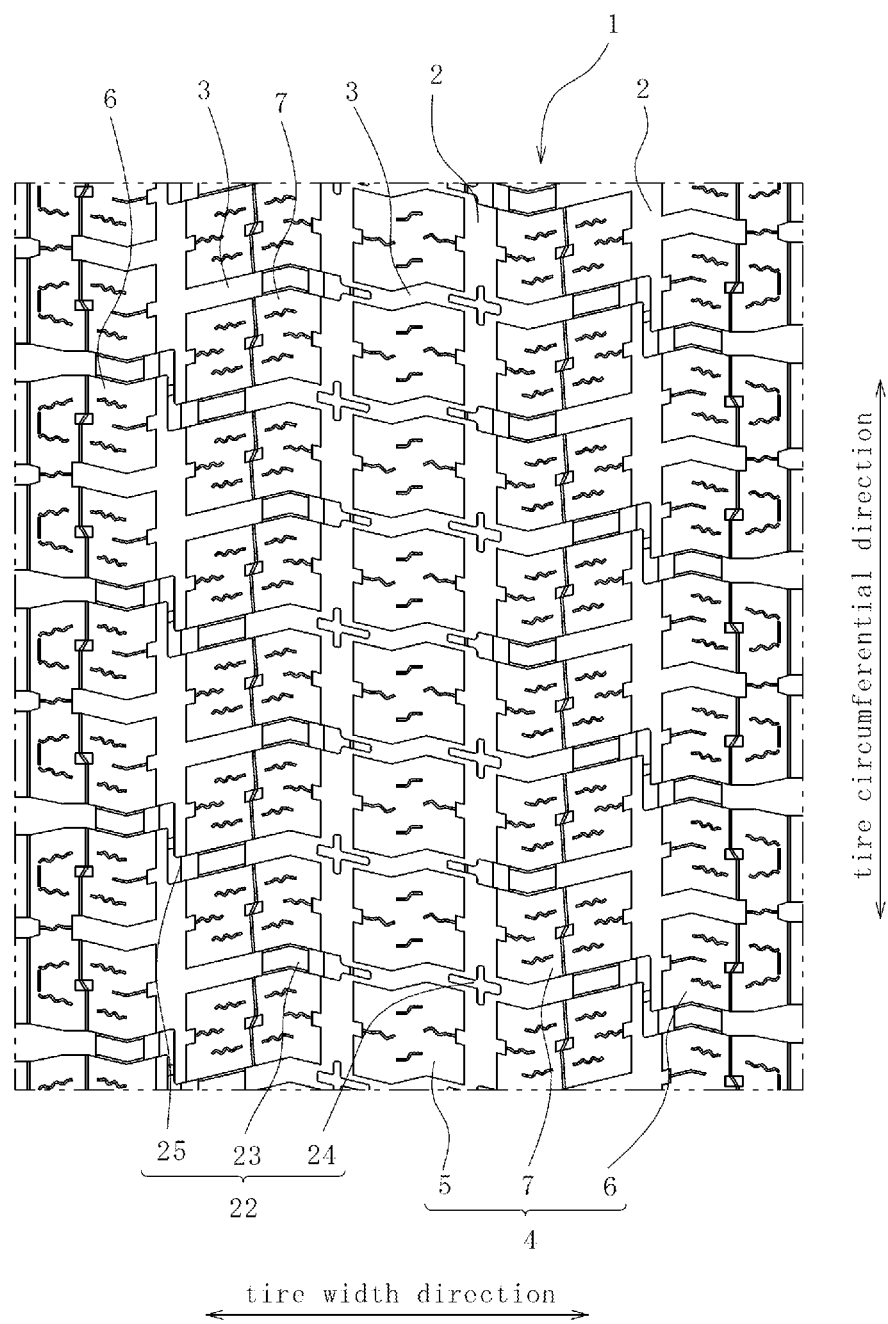
FIG. 1 is a developed view showing a tread surface of a pneumatic tire according to an embodiment of the present invention.
Figure 2:
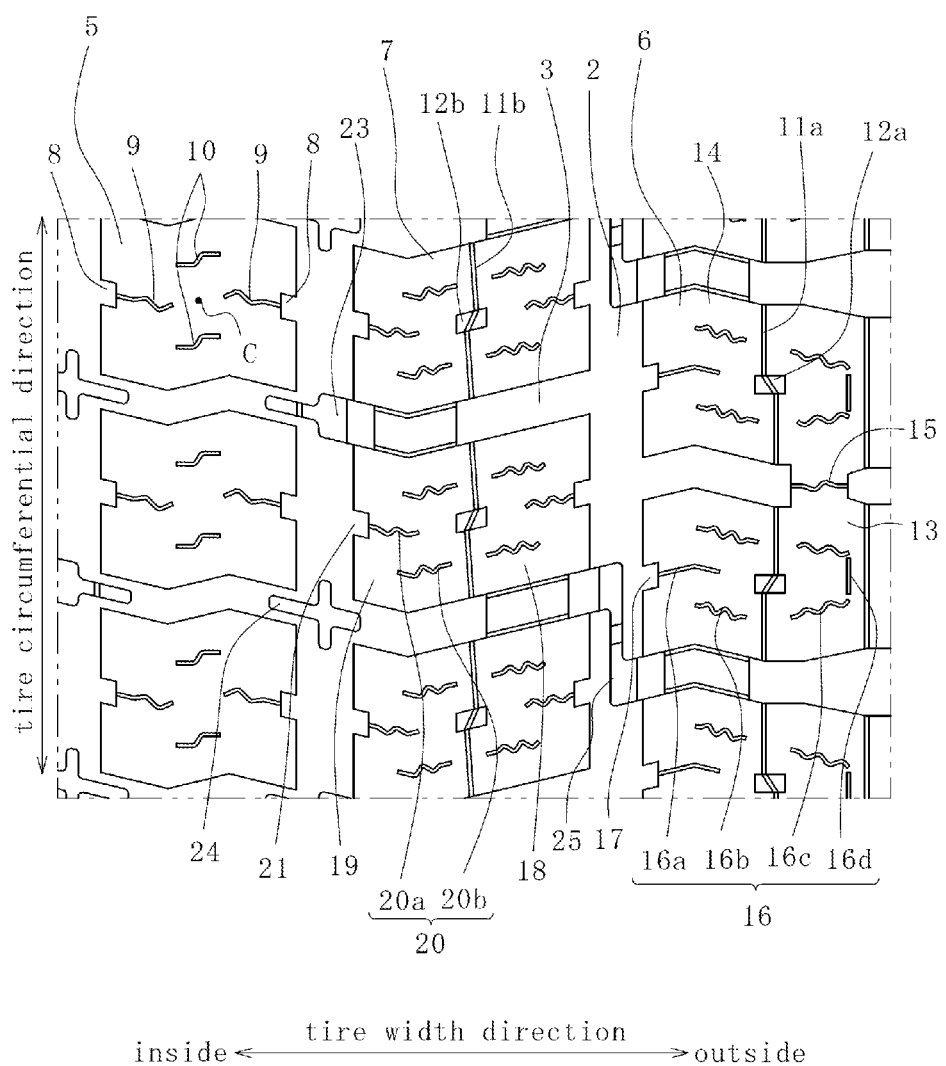
FIG. 2 is an enlarged view of a portion shown in FIG. 1.

FIG. 1 is a developed view showing a portion of a tread surface 1 of a pneumatic tire according to the embodiment of the present invention, and FIG. 2 is an enlarged view of the portion shown in FIG. 1. Four main grooves 2 extending in the tire circumferential direction are formed on the tread surface 1 at predetermined intervals in the tire width direction. A plurality of lateral grooves 3 which intersect with the main grooves 2 are formed on the tread surface 1. A plurality of blocks 4 are formed by the main grooves 2 and the lateral grooves 3.

Each block 4 is formed into an approximately rectangular shape where a lateral size in the tire width direction is set larger than a longitudinal size in the tire circumferential direction. These blocks 4 are constituted of center blocks 5 which are formed in a center region in the tire width direction, shoulder blocks 6 which are formed on both side regions in the tire width direction, and mediate blocks 7 which are formed between the center blocks 5 and the shoulder blocks 6 in the tire width direction.

In each center block 5, a recessed groove 8 which extends from a groove bottom and opens at an upper surface is formed on center portions of side surfaces on main groove 2 sides respectively. The lateral groove 3 formed between both sides of the center blocks 5 is formed in a zigzag shape such that the lateral groove 3 is bent at two portions. A width size of the lateral groove 3 formed between the center blocks 5 is set smaller than a width size of the lateral groove 3 formed between the shoulder blocks 6 and a width size of the lateral groove 3 formed between the mediate blocks 7 which are described later. In this embodiment, the width size of the lateral groove 3 formed between the center blocks 5 is set to 10% to 35% (preferably 20% to 25%) of a size of the center block 5 in the tire circumferential direction. By suppressing the width size of the lateral groove 3 at a small value, it is possible to suppress the deformation of the center block 5 per se on which the largest ground contact pressure is easy to act when the pneumatic tire 1 is brought into contact with a road surface during traveling. Accordingly, the lateral groove 3 hardly collapses although the center block 5 is deformed thus allowing the center block 5 to exhibit an original snow biting effect (effect of effectively increasing a snow column shearing force).

Four sipes extending in the tire width direction are formed on the center block 5 such that four sipes surround the center position C of the center block 5. Two sipes (first sipes 9) are formed such that one end of the first sipe 9 opens in the above-mentioned each recessed groove 8 and the other end of the first sipe 9 is terminated on an inner side of the center block 5. The first sipe 9 is formed in a zigzag shape by being bent at two portions, and these first sipes 9 are formed in point symmetry with respect to the center position C of the center block 5. Remaining two sipes (second sipes 10) differ from the first sipes 9 with respect to a point that both ends of the second sipe 10 are terminated in the inside of the center block 5. The second sipe 10 extends in the tire width direction, is formed in a zigzag shape by being bent at three portions. The second sipes 10 are arranged at positions rotationally displaced by 90 degrees with respect to the first sipes 9 about the center position C, and the second sipes 10 are formed in point symmetry with respect to the center position C.

In this manner, by making one end of the first sipe 9 open in the recessed groove 8 and by terminating the other end of the first sipe 9 in the inside of the center block 5 and, at the same time, by making both ends of the second sipe 10 terminate in the inside of the center block 5, when the center block 5 is brought into contact with a road surface, it is possible to make the distribution of ground contact pressure uniform. Accordingly, a ground contact area can be increased and hence, a friction resistance of the center block 5 with a road surface can be increased whereby traveling performance on ice can be enhanced. Further, a recessed portion 12 described later is not formed on the center block 5 and hence, there is no possibility that the center block 5 is deformed into an irregular shape during traveling to impede the stability of a vehicle.

The shoulder block 6 and the mediate block 7 are respectively divided in two in the tire width direction by groove portions 11a, 11b which extend in the tire circumferential direction. A recessed portion 12a, 12b (snow hole) is formed in a center portion of the shoulder block 6 and the mediate block 7, respectively. Although the groove portions 11a, 11b extend approximately in the tire circumferential direction, the groove portions 11a, 11b are bent obliquely in the recessed portions 12a, 12b and hence, the positions of the groove portions 11a, 11b are slightly displaced in the tire width direction. Due to the formation of the groove portions 11a, 11b, it is possible to effectively prevent a skid when a vehicle performs turn traveling on ice. The recessed portions 12a, 12b have an approximately rectangular shape as viewed in a plan view, wherein a lateral size in the tire width direction is set larger than a longitudinal size in the tire circumferential direction in conformity with a shape of the block 4, and a depth size is set smaller than a depth size of the main groove 2. Due to the formation of the recessed portions 12a, 12b, the recessed portions 12a, 12b exhibit a snow biting effect when a vehicle travels on a snow surface. Further, the recessed portions 12a, 12b are communicated with the groove portions 11a, 11b and hence, snow bitten in the recessed portions 12a, 12b can be easily discharged. Accordingly, there is no possibility that snow is kept bitten in the recessed portions 12a, 12b so that the recessed portions 12a, 12b do not exhibit a snow biting effect.

The shoulder block 6 is divided into an outer block portion 13 and an inner block portion 14 by the groove portion 11a. The lateral groove 3 is divided such that for each pair of inner block portions 14 which is arranged adjacent to each other, the outer block portions 13 corresponding to the inner block portions 14 are connected to each other. A sipe 15 is formed on a boundary portion between the outer block portions 13. Both ends of the sipe 15 are respectively communicated with the divided lateral grooves 3. Besides the sipe 15, six sipes 16 are also formed in the shoulder block 6.

Among three sipes 16 formed in the inner block portion 14, the sipe 16a which is positioned at the center of the inner block portion 14 has one end thereof opened in a recessed groove 17 formed on a side surface on a main groove 2 side and the other end thereof bent and terminated in the inner block portion 14. The remaining two sipes 16b are formed in a zigzag shape bent at six positions, and are formed parallel to each other, and both ends of each sipe 16b are terminated in the inner block portion 14.

Three sipes 16 formed in the outer block portion 13 are formed such that both ends of each sipe 16 are terminated in the outer block portion 13. Two sipes 16c are formed into a zigzag shape in a state where both sipes 16c gradually approach each other in the direction toward the outside from the inside. One remaining sipe 16d is formed linearly, and both ends of the sipe 16d are respectively positioned in the vicinity of outer ends of two sipes 16c.

The mediate block 7 is separated into an outer block portion 18 and an inner block portion 19 by a groove portion 1ib in the same manner as the shoulder block 6. Six sipes 20 formed in a zigzag shape are formed in the mediate block 7. These sipes 20 are arranged so as to surround the recessed portion 12b. Two sipes 20a are formed such that one ends of the sipes 20a are opened in recessed grooves 21 formed on side surfaces of the mediate block 7 on main groove sides and the other ends of the sipes 20a are bent and terminated in the outer block portion 18 and the inner block portion 19 respectively. Remaining four sipes 20b are arranged parallel to each other along side surfaces of the mediate block 7 on lateral groove 3 sides.

The lateral grooves 3 which are positioned on both sides of the center block 5, the shoulder block 6 and the mediate block 7 respectively are formed on the tread surface 1 at the same pitch in the tire circumferential direction. The lateral grooves 3 formed between the center blocks 5 and the lateral groove 3 formed between the mediate blocks 7 are formed on the approximately same straight line (the approximately same straight line means a region having a predetermined size in the tire circumferential direction). By arranging the lateral grooves 3 on the approximately same straight line, it is possible to enhance traction property when a vehicle starts traveling. That is, by aligning the lateral groove 3 with each other, a plurality of lateral grooves 3 bite into snow at the time of starting a vehicle so that it is possible to increase a snow column shearing force in the tire circumferential direction.

Auxiliary blocks 22 are formed in the main grooves 2 and the lateral grooves 3. The auxiliary blocks 22 are constituted of first auxiliary blocks 23, second auxiliary blocks 24 and third auxiliary blocks 25.

The first auxiliary block 23 and the second auxiliary block 24 are formed ranging from the lateral groove 3 between the center blocks 5 to the lateral groove 3 between the mediate blocks 7 via the main groove 2 between the center block 5 and the mediate block 7.

Figure 3:
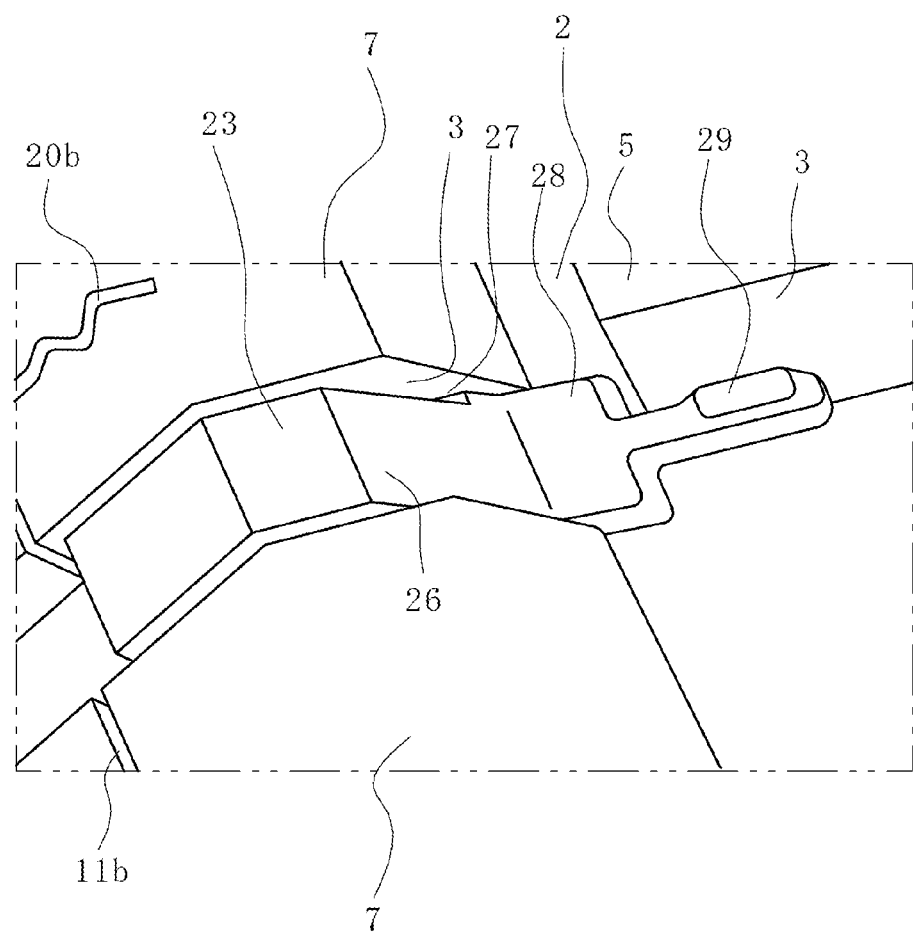
FIG. 3 is a partially perspective view showing a first auxiliary block shown in FIG. 1.

As shown in FIG. 3, with respect to the first auxiliary block 23, a first projection 26 is formed in an approximately half region (a region ranging from an area in the vicinity of the groove portion 11b to an area in the vicinity of the main groove 2) in the lateral groove 3 between the mediate blocks 7. A narrow groove 27 is formed between the first projection 26 and a side surface of each mediate block 7. A second projection 28 having the same width size as the lateral groove 3 is formed in a region ranging from the lateral groove 3 to the main groove 2. A width of a distal end portion of the second projection 28 is narrowed thus forming a third projection 29 extending toward the inside of the lateral groove 3 between the center blocks 5. As shown in FIG. 1 and FIG. 2, the second auxiliary block 24 has an approximately cruciform shape as viewed in a plan view where portions having a narrow width extend to the respective lateral grooves 3 and the main groove 2.

The first auxiliary block 23 and the second auxiliary block 24 are alternately arranged in the tire circumferential direction, and the first auxiliary block 23 and the second auxiliary block 24 correspond to each other at positions on both sides which sandwich the center block 5 therebetween.

Figure 4:
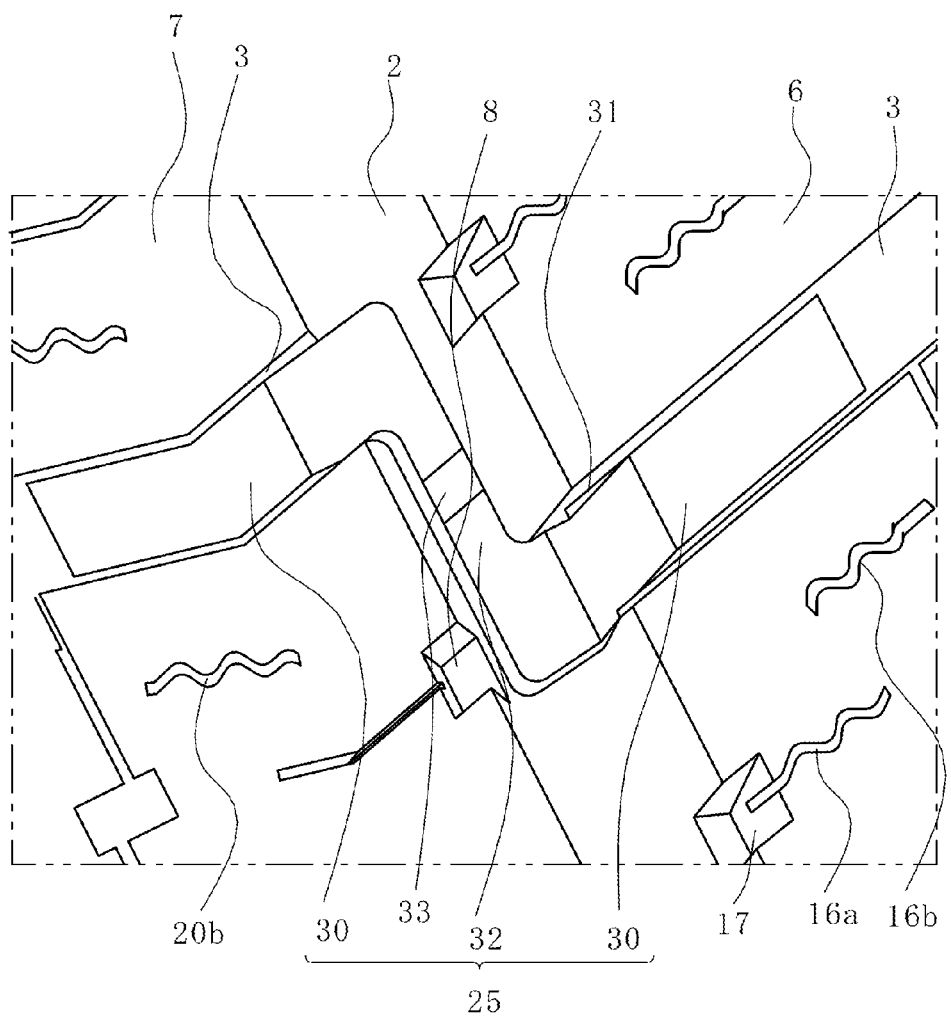
FIG. 4 is a partially perspective view showing a third auxiliary block shown in FIG. 1.

As shown in FIG. 4, the third auxiliary block 25 is formed ranging from the lateral groove 3 between the shoulder blocks 6 to the lateral groove 3 between the mediate blocks 7 via the main groove 2 between the shoulder block 6 and the mediate block 7. The lateral groove 3 between the shoulder blocks 6 is formed at the position displaced by a half pitch in the tire circumferential direction with respect to the lateral groove 3 between the mediate blocks 7. In the third auxiliary block 25, a first projection 30 is formed in an approximately half region (a region ranging from the main groove 2 to an area in the vicinity of the groove portion 11) in each lateral groove 3. A narrow groove 31 is formed, in the same manner as the first auxiliary block 23, between a side surface which forms the lateral groove 3 and the first projection 30. A second projection 32 which connects the first projections 30 to each other is formed in the main groove 2. The second projection 32 is formed with a width size which is approximately ⅓ of a width size of the main groove 2. A concave portion 33 which extends in the tire width direction is formed in an intermediate portion of the second projection 32.

In this manner, the third auxiliary block 25 is configured such that the first projections 30 formed in the respective lateral grooves 3 which are displaced from each other by a half pitch are connected to each other by the second projection 32 and hence, the joining of the shoulder block 6 and the mediate block 7 can be strengthened not only in the tire width direction but also in the tire circumferential direction. Accordingly, it is possible to provide the pneumatic tire with the constitution which strongly resists to the deformation thereof during traveling. Further, the second projection 32 in the main groove 2 plays a role of effectively removing pebbles or the like bitten in the main groove 2. That is, a depth of the main groove 2 changes between portions where the second projection 32 is formed and portions where the second projection 32 is not formed. A foreign material such as a pebble or the like bitten in the main groove 2 due to the rotation of the tire moves in the inside of the main groove 2 in the tire circumferential direction, and rides on the second projection 32 and hence, the removal of the foreign material is facilitated. Further, at this point of time, the respective blocks 6, 7 are easily deformable due to a function of the recessed portions 12 formed in the center portions of the blocks 6, 7 and hence, a pebble or the like easily moves and falls.

Further, end portions of each auxiliary block 22 are positioned in the inside of the lateral groove 3. That is, the end portions of each auxiliary block 22 are positioned more inside than end portions of each block 4 (5, 6, 7) on a main groove 2 side. In other words, the end portions of each auxiliary block 22 are guided by the blocks 4 on both sides which form the lateral groove 3 therebetween. Accordingly, unlike the case where end portions of each auxiliary block 22 terminate in the inside of the main groove 2, there is no possibility that an edge portion, particularly a corner portion is damaged by a foreign material which intrudes into the inside of the main groove 2. Particularly, an edge portion of each block 4 is not influenced by the auxiliary block 22 and hence, when a vehicle travels on ice or the like, resistance generated when an edge (corner) portion of the block scrapes snow (edge effect) is not deteriorated.

FIG. 5 shows the result of evaluations on traveling performance on ice, traveling performance on snow and biased abrasion resistance with respect to the combinations of the case where the recessed portion 12 is formed in each block 4 and the case where the recessed portion 12 is not formed in each block 4. The evaluations are made under conditions that a pneumatic tire having a tire size of 11R22.5 is assembled to a rim (22.5×7.50), air is filled in the tire until an inner pressure in the tire becomes 700 [kPa], and the tire is mounted on a 2-D·4 vehicle having a rated load of 10 t. Then, the evaluations are made by comparing tires having different conditions on the recessed portion 12 and the auxiliary block 22 with a standard tire prepared as below, wherein the evaluation criteria of the standard tire is set as 100. The standard tire is prepared such that a recessed portion 12 is formed in none of blocks 4 and an auxiliary block 22 is formed straddling over a main groove 2 and a lateral groove 3, and a rate of the auxiliary block 22 with respect to the block 4 in the tire width direction is set to 35%.

The above-mentioned respective performances have the following meanings.

Traveling Performance on Ice:

Numerical values are obtained by performing the measurement and functional evaluations on respective performances consisting of starting, braking and turning on an ice field, and by averaging the result of the measurement and functional evaluations as indexes. The larger the numerical values, the more excellent traveling performance on ice a vehicle exhibits.

Traveling Performance on Snow:

Numerical values are obtained by performing the measurement and functional evaluations on respective performances consisting of starting, braking and turning on a snow road, and by averaging the result of the measurement and functional evaluations as indexes. The larger the numerical value, the more excellent traveling performance on snow a vehicle possesses.

Biased Abrasion Resistance:

A value is obtained by measuring a T/H amount (a step height between a stepping side and a kicking side) of a block after traveling 20,000 km, and by setting a measured value as an index. The larger the index, the smaller a falling amount and the T/H amount of the block become thus exhibiting favorable biased abrasion resistance.

FIG. 6A shows the result of evaluations on the performances of the tires extracted from FIG. 5 with respect to the case where the recessed portion 12 is formed on each block 4 and the case where the recessed portion 12 is not formed on each block 4. FIG. 6B is a view in the form of a graph provided for facilitating the visual understanding of the content shown in FIG. 6A. As can be clearly understood from the graph, the traveling performance on snow is enhanced by forming the recessed portion 12 in all blocks 4. However, the traveling performance on ice and the biased abrasion resistance can be enhanced by not forming recessed potion 12 on the center blocks 5. That is, in accordance with the finding made by the inventers of the present invention, it is proved that not only the traveling performance on snow but also the traveling performance on ice and the biased abrasion resistance can be enhanced by forming the recessed portion 12 on the shoulder blocks 6 and the mediate blocks 7 while not forming the recessed portion 12 on the center blocks 5.

Figures 7A, 7B:
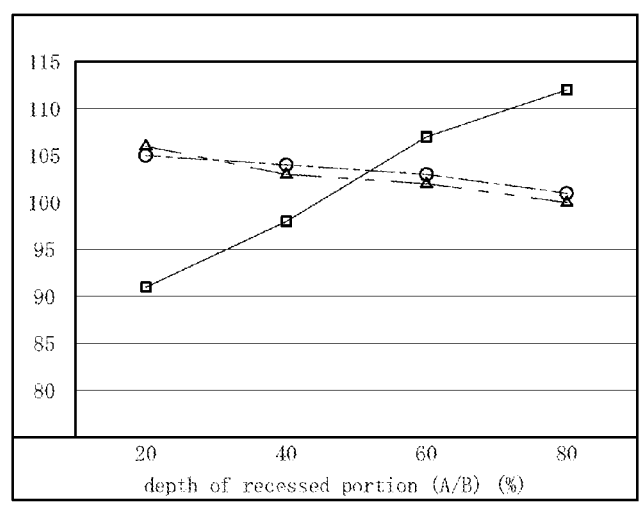
FIG. 7A is a table prepared by extracting the result of evaluations on the tire performance in the case where a rate of a depth of the recessed portion formed in each block with respect to a depth of a main groove is changed from FIG. 5.
FIG. 7B is a view in the form of a graph prepared in accordance with table shown in FIG. 7A.

FIG. 7A shows the result of evaluations on the performances of tires extracted from FIG. 5 when a rate of a depth of the recessed portion 12 formed on each block 4 with respect to a depth of the main groove 2 is changed. FIG. 7B is a view in the form of a graph showing the content of FIG. 7A in the same manner as FIG. 6B. As can be clearly understood from the graph, the performance on travelling on snow is enhanced in accordance with the increase of a rate of the depth of the recessed portion 12, while the traveling performance on ice and the biased abrasion resistance are excellent compared to those of the above-mentioned standard tire although the traveling performance on ice and the biased abrasion resistance are lowered.

Figures 8A, 8B:
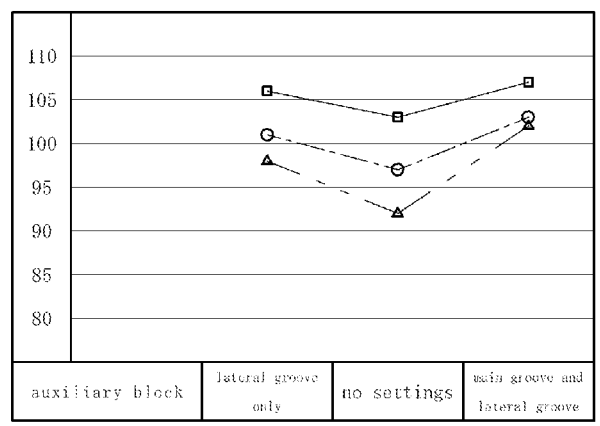
FIG. 8A is a table prepared by extracting the result of the evaluation on the tire performance in the case where the presence or the absence of the formation of auxiliary blocks and ranges where the auxiliary blocks are formed are changed from FIG. 5.
FIG. 8B is a view in the form of a graph prepared in accordance with table shown in FIG. 8A.

FIG. 8A shows the result of evaluations on the performances of tires extracted from FIG. 5 when the presence or the absence of the formation of the auxiliary blocks and a range where the auxiliary blocks are formed are changed. In the same manner as FIG. 6B and FIG. 7B, FIG. 8B is a view showing the content of FIG. 8A in the form of a graph. As can be clearly understood from the graph, by forming the auxiliary block 22 extending over the main groove 2 and the lateral groove 3, not only the performance of the traveling on snow but also the traveling performance on ice and the biased abrasion resistance can be enhanced.

Figures 9A, 9B:
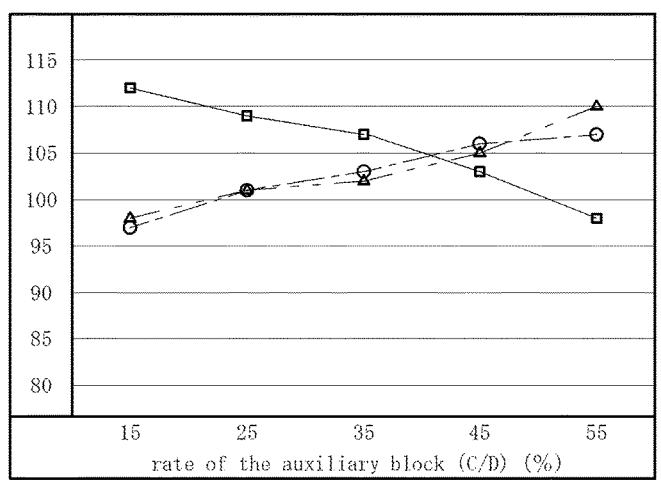
FIG. 9A is a table prepared by extracting the result of evaluations on the tire performance in the case where a rate of the auxiliary block is changed with respect to a size of the block in the tire width direction from FIG. 5.
FIG. 9B is a view formed in the form of a graph prepared in accordance with FIG. 9A.

FIG. 9A shows the result of the evaluations extracted from FIG. 5 on performances of tires when a rate of the auxiliary block 22 with respect to a size of the block 4 is changed in the tire width direction. FIG. 9B is a view showing the content in FIG. 9A in the form of a graph in the same manner as FIG. 6B, FIG. 7B and FIG. 8B. As can be clearly understood from the graph, by setting such a rate to 25 to 45%, all performances can be enhanced.

The present invention is not limited to the constitution described in the above-mentioned embodiment, and various modifications are conceivable.

For example, in the above-mentioned embodiment, the shoulder blocks 6 are formed at positions displaced with respect to the mediate blocks 7 in the tire circumferential direction by a half pitch. However, such a displacement amount can be freely set. Further, even when there is no displacement amount, the third auxiliary block 25 may be formed such that the lateral grooves 3 at the positions displaced from each other in the tire circumferential direction are connected to each other by the third auxiliary block 25.

Further, although it is not particularly referred to in the above-mentioned embodiment, the pneumatic tire having the above-mentioned constitution is optimally applicable to a vehicle for conveying a large weight such as a truck or a bus having a weight of 4 t or more.

In the above-mentioned embodiment, the lateral groove 3 formed by the shoulder blocks 6 on which the recessed portion 12 is formed and the lateral groove 3 formed by the mediate blocks 7 are connected to each other by the auxiliary block 22. However, the lateral grooves 3 formed in the blocks 4 applied to other different types of tires having no recessed portions 12 may be connected to each other by the auxiliary block 22.

What is claimed is:

1. A pneumatic tire comprising a plurality of blocks formed on a tread surface by a plurality of main grooves extending in the tire circumferential direction and a plurality of lateral grooves which intersect with the plurality of main grooves, wherein
    a size of a block in the tire width direction is set larger than a size of a block in the tire circumferential direction,
    the plurality of blocks include:
    a plurality of center blocks which are positioned in a center region in the tire width direction;
    a plurality of shoulder blocks which are positioned on both side regions in the tire width direction; and
    a plurality of mediate blocks which are positioned in an intermediate region between the plurality of center blocks and the plurality of shoulder blocks, a recessed portion which is formed on an approximately center portions of the plurality of shoulder blocks and the plurality of mediate blocks excluding the plurality of center blocks, and
    at least four sipes which extend in the tire width direction formed in each of the plurality of blocks,
    wherein at least two of the at least four sipes formed in a center block at a center portion in the tire circumferential direction has one end thereof opened in a main groove and another end thereof terminated inside of said center block, and
    at least two of the at least four sipes formed in each of the plurality of blocks have both ends thereof terminated inside each of said plurality of blocks, and
    wherein the pneumatic tire includes an auxiliary block which connects via a main groove of the plurality of main grooves, a lateral groove of the plurality of lateral grooves formed between the plurality of shoulder blocks and a lateral groove of the plurality of lateral grooves formed between the plurality of mediate blocks which are positionally displaced from each other in the tire circumferential direction.

2. The pneumatic tire according to claim 1, wherein the plurality of shoulder blocks and the plurality of mediate blocks extend in the tire circumferential direction, and include a groove portion which separates the plurality of shoulder blocks and the plurality of mediate blocks in the tire width direction.

3. The pneumatic tire according to claim 1, wherein the at least four sipes formed in the plurality of shoulder blocks and the plurality of mediate blocks are arranged so as to surround a center position of each said plurality of shoulder blocks and plurality of mediate blocks.

4. The pneumatic tire according to claim 1, wherein a lateral groove of the plurality of lateral grooves which separate the plurality of center blocks in the tire circumferential direction and a lateral groove of the plurality of lateral grooves which separate the plurality of mediate blocks in the tire circumferential direction are aligned with each other.

5. The pneumatic tire according to claim 1, wherein a size in the tire width direction of a first projection formed in the auxiliary block positioned in the inside of the lateral groove of the plurality of lateral grooves formed between the plurality of shoulder blocks or in the inside of the lateral groove of the plurality of lateral grooves formed between the plurality of mediate blocks is 20% or more and 50% or less of the size in the tire width direction of the block.

6. The pneumatic tire according to claim 1, wherein an end portion of the auxiliary block is terminated in the inside of the lateral groove of the plurality of lateral grooves formed between the plurality of shoulder blocks or in the inside of the lateral groove of the plurality of lateral grooves formed between the plurality of mediate blocks.

7. The pneumatic tire according to claim 6, wherein the end portion of the auxiliary block is terminated in the inside of the lateral groove of the plurality of lateral grooves formed between the plurality of shoulder blocks and another end portion of the auxiliary block is terminated in the inside of the lateral groove of the plurality of lateral grooves formed between the plurality of mediate blocks.

8. The pneumatic tire according to claim 1, wherein a portion of the auxiliary block formed in the main groove of the plurality of main grooves is formed with a groove depth smaller than a groove depth of portions formed in the lateral groove of the plurality of lateral grooves formed between the plurality of shoulder blocks or the lateral groove of the plurality of lateral grooves formed between the plurality of mediate blocks.

9. The pneumatic tire according to claim 1, wherein a second projection positioned in the inside of the main groove of the plurality of main grooves formed on the auxiliary block includes a concave portion where a depth of the concave portion is partially increased.

10. The pneumatic tire according to claim 1, comprising a plurality of auxiliary blocks.

\* \* \* \* \*